United States Patent
Waxman et al.

(10) Patent No.: US 7,916,711 B2
(45) Date of Patent: Mar. 29, 2011

(54) SYSTEMS AND METHODS FOR SAVING POWER IN A DIGITAL BROADCAST RECEIVER

(75) Inventors: Shay Waxman, Sunnyvale, CA (US); Oren Arad, Palo Alto, CA (US)

(73) Assignee: SiPort, Inc., Santa Clara, CA (US)

( * ) Notice: Subject to any disclaimer, the term of this patent is extended or adjusted under 35 U.S.C. 154(b) by 910 days.

(21) Appl. No.: 11/800,209

(22) Filed: May 3, 2007

(65) Prior Publication Data

US 2007/0218936 A1    Sep. 20, 2007

Related U.S. Application Data

(63) Continuation-in-part of application No. 11/389,277, filed on Mar. 23, 2006.

(60) Provisional application No. 60/664,990, filed on Mar. 24, 2005.

(51) Int. Cl.
*H04B 7/212* (2006.01)
*H04B 1/04* (2006.01)

(52) U.S. Cl. .................................. 370/347; 455/127.1

(58) Field of Classification Search .................. None
See application file for complete search history.

(56) References Cited

U.S. PATENT DOCUMENTS

| | | | |
|---|---|---|---|
| 4,710,747 A | 12/1987 | Holland | |
| 4,761,644 A * | 8/1988 | Kawai et al. | 340/5.64 |
| 4,910,752 A | 3/1990 | Yester, Jr. et al. | |
| 5,140,698 A * | 8/1992 | Toko | 455/76 |
| 5,155,479 A * | 10/1992 | Ragan | 370/350 |
| 5,325,088 A * | 6/1994 | Willard et al. | 370/313 |
| 5,555,183 A * | 9/1996 | Willard et al. | 340/825.21 |
| 5,654,952 A | 8/1997 | Suzuki | |
| 5,920,824 A | 7/1999 | Beatty et al. | |
| 6,057,795 A | 5/2000 | Suzuki | |
| 6,072,784 A | 6/2000 | Agrawal et al. | |
| 6,205,225 B1 | 3/2001 | Orban | |
| 6,232,905 B1 | 5/2001 | Smith et al. | |
| 6,259,681 B1 | 7/2001 | Kolev et al. | |
| 6,286,122 B1 | 9/2001 | Alanara | |
| 6,311,048 B1 | 10/2001 | Loke | |
| 6,317,065 B1 | 11/2001 | Raleigh | |
| 6,405,062 B1 | 6/2002 | Izaki | |
| 6,407,689 B1 | 6/2002 | Bazarjani et al. | |

(Continued)

FOREIGN PATENT DOCUMENTS

JP    2007243504    9/2007

OTHER PUBLICATIONS

U.S. Appl. No. 11/389,277, Sridhar Sharma, Low Power Digital Media Broadcast Receiver with Time Division, Mar. 23, 2006.

(Continued)

*Primary Examiner* — Andrew Lee
(74) *Attorney, Agent, or Firm* — Carr & Ferrell LLP

(57) ABSTRACT

Systems and methods for conserving power in a receiver device are provided. In exemplary embodiments, a receiver device comprises a tuner configured to receive a transmitted signal, at least one analog-to-digital converter (ADC), and a digital signal processing hardware comprising a control logic. The exemplary control logic is configured to determine if a symbol within the transmitted signal belongs to an erasure interval, and generate a control signal to configure a receiver device component to conserve power based on the determination.

17 Claims, 5 Drawing Sheets

U.S. PATENT DOCUMENTS

| | | |
|---|---|---|
| 6,438,364 B1 | 8/2002 | Waite |
| 6,466,913 B1 | 10/2002 | Yasuda |
| 6,504,863 B1 | 1/2003 | Hellmark |
| 6,219,333 B1 | 8/2003 | Ahn |
| 6,654,595 B1 | 11/2003 | Dexter |
| 6,671,371 B1 | 12/2003 | McNeill et al. |
| 6,693,953 B2 | 2/2004 | Cox et al. |
| 6,754,763 B2 | 6/2004 | Lin |
| 6,763,240 B1 | 7/2004 | Chambers |
| 6,765,931 B1 | 7/2004 | Rabenko et al. |
| 6,819,274 B2 | 11/2004 | Krone et al. |
| 6,862,325 B2 | 3/2005 | Gay-Bellile et al. |
| 7,006,617 B1 | 2/2006 | Del Farra |
| 7,127,008 B2 | 10/2006 | Kroeger |
| 7,205,923 B1 | 4/2007 | Bahai |
| 7,233,275 B2 | 6/2007 | Aksin et al. |
| 7,295,812 B2 | 11/2007 | Haapoja et al. |
| 7,299,021 B2 | 11/2007 | Parssinen et al. |
| 7,369,989 B2 | 5/2008 | Absar |
| 7,480,689 B2 | 1/2009 | Song |
| 7,555,661 B2 | 6/2009 | Luu |
| 2002/0126778 A1 | 9/2002 | Ojard |
| 2002/0169009 A1 | 11/2002 | Reiner |
| 2003/0078007 A1 | 4/2003 | Parssinen et al. |
| 2003/0159076 A1 | 8/2003 | Delisle |
| 2004/0080675 A1 | 4/2004 | Hoshino |
| 2004/0145508 A1 | 7/2004 | Gulati et al. |
| 2004/0223449 A1* | 11/2004 | Tsuie et al. .................. 370/204 |
| 2005/0047488 A1* | 3/2005 | Sugahara ..................... 375/148 |
| 2005/0081245 A1 | 4/2005 | Arad et al. |
| 2005/0094036 A1 | 5/2005 | Tichelaar |
| 2005/0239518 A1 | 10/2005 | D'Agostino et al. |
| 2006/0001779 A1 | 1/2006 | Favrat et al. |
| 2006/0082690 A1 | 4/2006 | Englert |
| 2006/0112157 A1 | 5/2006 | Song |
| 2006/0141974 A1 | 6/2006 | Campbell |
| 2006/0195498 A1 | 8/2006 | Dobbek |
| 2006/0212503 A1 | 9/2006 | Beckmann |
| 2007/0080800 A1 | 4/2007 | Carbone |
| 2007/0112901 A1 | 5/2007 | Niktash |
| 2007/0176816 A1 | 8/2007 | Wood |
| 2008/0097764 A1 | 4/2008 | Grill |
| 2009/0198753 A1 | 8/2009 | Benjelloun |

OTHER PUBLICATIONS

U.S. Appl. No. 11/496,767, Oren Arad, Systems and Methods for Dynamically Controlling an Analog-to-Digital Converter, Jul. 31, 2006.

U.S. Appl. No. 11/454,268, Oren Arad, Systems and Methods for Dynamically Controlling a Tuner, Jun. 16, 2006.

* cited by examiner

SYSTEMS AND METHODS FOR SAVING POWER IN A DIGITAL BROADCAST RECEIVER

CROSS-REFERENCE TO RELATED APPLICATION

The present application is a continuation-in-part application and claims the priority benefit of U.S. Nonprovisional patent application Ser. No. 11/389,277 entitled "Low Power Digital Media Broadcast Receiver with Time Division" filed Mar. 23, 2006, which claims priority benefit to U.S. Provisional Patent Application No. 60/664,990 entitled "Low Power Design of a Receiver using Time Slicing," filed Mar. 24, 2005, both of which are herein incorporated by reference.

BACKGROUND OF THE INVENTION

1. Field of Invention

Embodiments of the present invention are related to signal processing, and more particularly, to signal processing by a digital broadcast receiver.

2. Related Art

Conventionally, digital wireless communication systems are designed to provide reliable reception under multiple channel impairments such as additive noise and multi-path fading. A typical wireless digital communication system implements methods for protecting the transmitted data. Such methods usually include error protection coding that introduces data redundancy into a data stream. A wireless receiver can use this data redundancy in order to correct errors that are introduced to the data stream over a wireless medium.

In addition to error protection, many systems incorporate time interleaving. In time interleaving, a continuous sequence of data is interleaved over time, such that a consecutive bit sequence before the interleaving operation becomes non-consecutive. As a result, the bit sequence is transmitted non-consecutively over time. The data sequence is, therefore, transmitted non-sequentially over the air. This interleaving, in combination with error protection coding, can correct bursts of error in the received data. As a result, the bit error rate (BER) after the error correction may be lower when compared to an error rate without the error correction.

In a commercial wireless communication system, the error protection provided by a transmission system is designed to ensure that, under the most extreme reception condition for which the system is designed, the decoded BER is below a certain desired threshold. This BER threshold is referred to as a maximum allowed BER (MAB) threshold. The MAB threshold depends on the type of service that the communication system provides. Below the MAB threshold, quality of the service provided by the system meets a desired quality. For example, in digital audio broadcasting systems, the MAB threshold may be set such that the user is unable to detect any degradation in the received audio quality. This BER threshold is also called threshold of audible impairments (TAI).

A commonly used method for modulating data onto a wireless channel is orthogonal frequency division multiplexing (OFDM), where digital information is modulated on a plurality of carriers that are orthogonal to each other. An OFDM symbol comprises a signal containing a plurality of carriers over a finite interval, called the OFDM symbol interval. A sequence of OFDM symbols comprises a transmitted wireless signal. One exemplary OFDM transmission system is the IBOC system, described in the NRSC-5A standard. Another exemplary OFDM transmission system is DAB/TDMB described in the ETSI EN300401 standard.

Under typical reception conditions, the error protection that a common OFDM transmission system can provide exceeds the protection needed to achieve the MAB threshold (i.e., the decoded BER is lower then the MAB). The difference between the MAB threshold and the decoded BER is referred to as a reception coding margin (RCM). It is not uncommon that some percentage of the received information prior to the error correction can be erased at the receiver and the resulting decoded BER may still be lower or equal to the MAB threshold. The amount of data that can be erased is a function of the RCM; the greater the RCM, the more information that can be erased.

Receivers can consume considerable power in performing the functions of signal reception, signal processing, and error correction sufficient to achieve the desired quality. Therefore, there is a need for power conservation at the receiver.

SUMMARY OF INVENTION

Systems and methods for conserving power in a receiver device are provided. In exemplary embodiments, a receiver device comprises a tuner configured to receive a transmitted signal, at least one analog-to-digital converter (ADC), and a digital signal processing hardware comprising a control logic. The exemplary control logic is configured to determine if a symbol within the transmitted signal belongs to an erasure interval, and generate a control signal to configure a receiver device component to conserve power based on the determination.

DETAILED DESCRIPTION OF EXEMPLARY EMBODIMENTS

Embodiments of the present invention provide for adaptively optimized power consumption of a receiver device based on instantaneous performance requirements that are necessary for reliable reception. The exemplary system provides a receiver device (e.g., radio receiver) comprising at least one analog-to-digital converter (ADC), a tuner, and digital signal processing hardware (DSPHW). In exemplary embodiments, ADC resolution is dynamically controlled to reduce power and/or increase resolution. The DSPHW is configured to analyze a received signal and channel characteristics in order to control the ADC resolution and optimize power consumption and performance.

Figure 1:
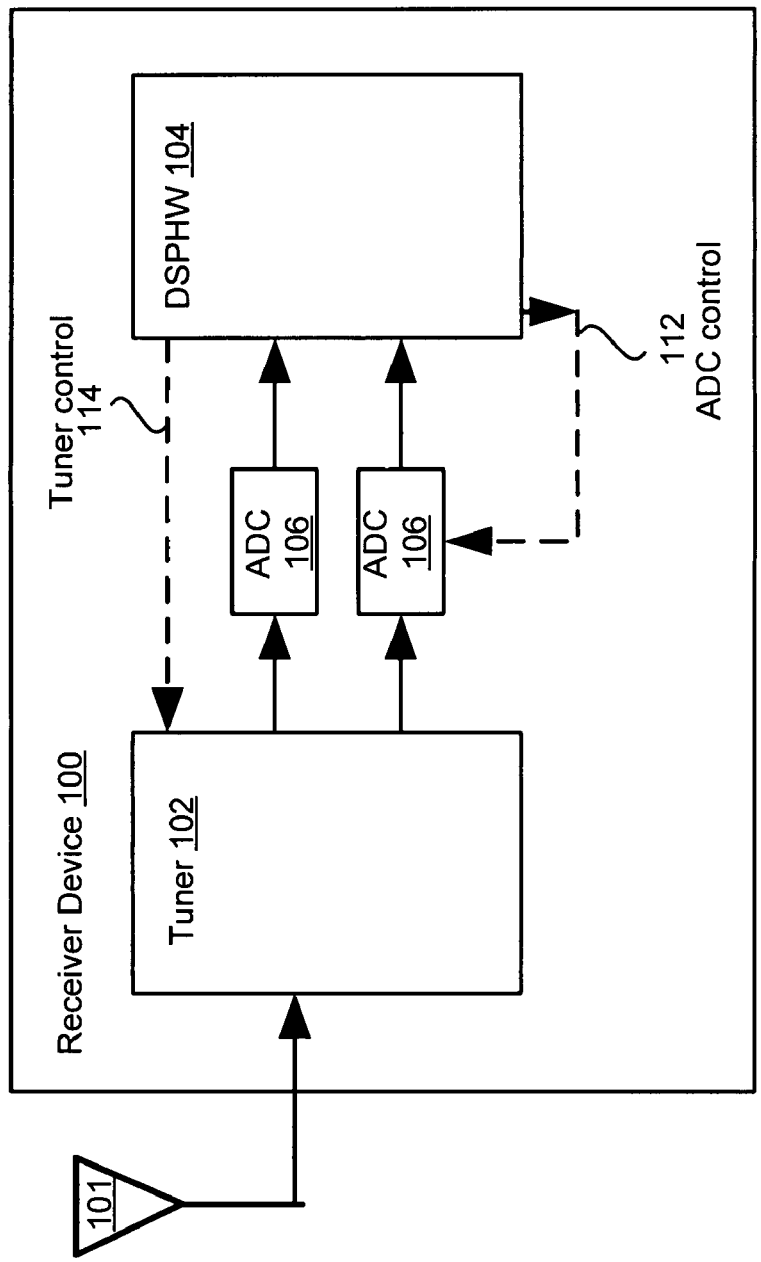
FIG. 1 is a block diagram of an exemplary radio frequency (RF) receiver device capable of receiving communication signals.

FIG. 1 is a block diagram of an exemplary radio frequency (RF) receiver device 100 capable of receiving communication (i.e., transmitted) signals via an antenna 101. The receiver device 100 comprises a tuner 102, analog-to-digital converters (ADCs) 106, and digital signal processing hardware (DSPHW) 104. The tuner 102 tunes a desired communication channel transmitted over a specific RF band, and down-converts the communication channel to an intermediate frequency (IF) or zero frequency (DC). The down-converted signal can then be sampled by one or more ADCs 106, to form a digital representation of the down-converted signal. The DSPHW 104 comprises digital logic circuitry configured to demodulate the sampled signal received from the ADC(s) 106 and recover the information that was modulated in the originally transmitted signal. In some embodiments, the DSPHW 104 comprises hard-wired digital logic, hard programmable digital logic, a programmable processor, or a combination of the hard-wired digital logic, the hard programmable digital logic, and/or the programmable processor.

The receiver device 100 also comprises a tuner control line 114 and one or more ADC control lines 112. The tuner control line 114 may be located between the DSPHW 104 and the tuner 102. The ADC control line(s) 112 may be located between the DSPHW 104 and one or more ADC(s) 106. In one example, the DSPHW 104 tunes the desired channel by controlling the tuner 102 over the tuner control line 114. Further, the DSPHW 104 may control the sampling of the desired channel by configuring one or more of the ADC(s) 106 over the ADC control line 112.

In exemplary embodiments, the DSPHW 104 is capable of controlling the power consumption of the tuner 102 by controlling currents supplied to some or all of the components inside the tuner 102. The DSPHW 104 can completely turn off the current consumption of some of the tuner components by setting one or more components to a "power off" mode. The DSPHW 104 can also reduce the power consumption of some of the tuner components by setting one or more components to a "power standby" mode.

Similarly, the DSPHW 104 can control the power consumption of one or more of the ADC(s) 106 by setting the ADC(s) 106 to a "power off" or "standby" mode. The DSPWH 104 is also capable of controlling the power consumption of the receiver device 100 by clock gating one or more clocks within the receiver device 100 and/or clock gating one or more clocks within the DSPHW 104.

In exemplary embodiments, the receiver device 100 comprises receiver device components. Examples of receiver device components includes, but are not limited to, the tuner 102, the ADC(s) 106, the DSPHW 104, as well as various components of the tuner 102 (i.e., tuner components), ADC(s) 106 (i.e., ADC components), and DSPHW 104 (i.e., DSPHW components).

Figure 2:
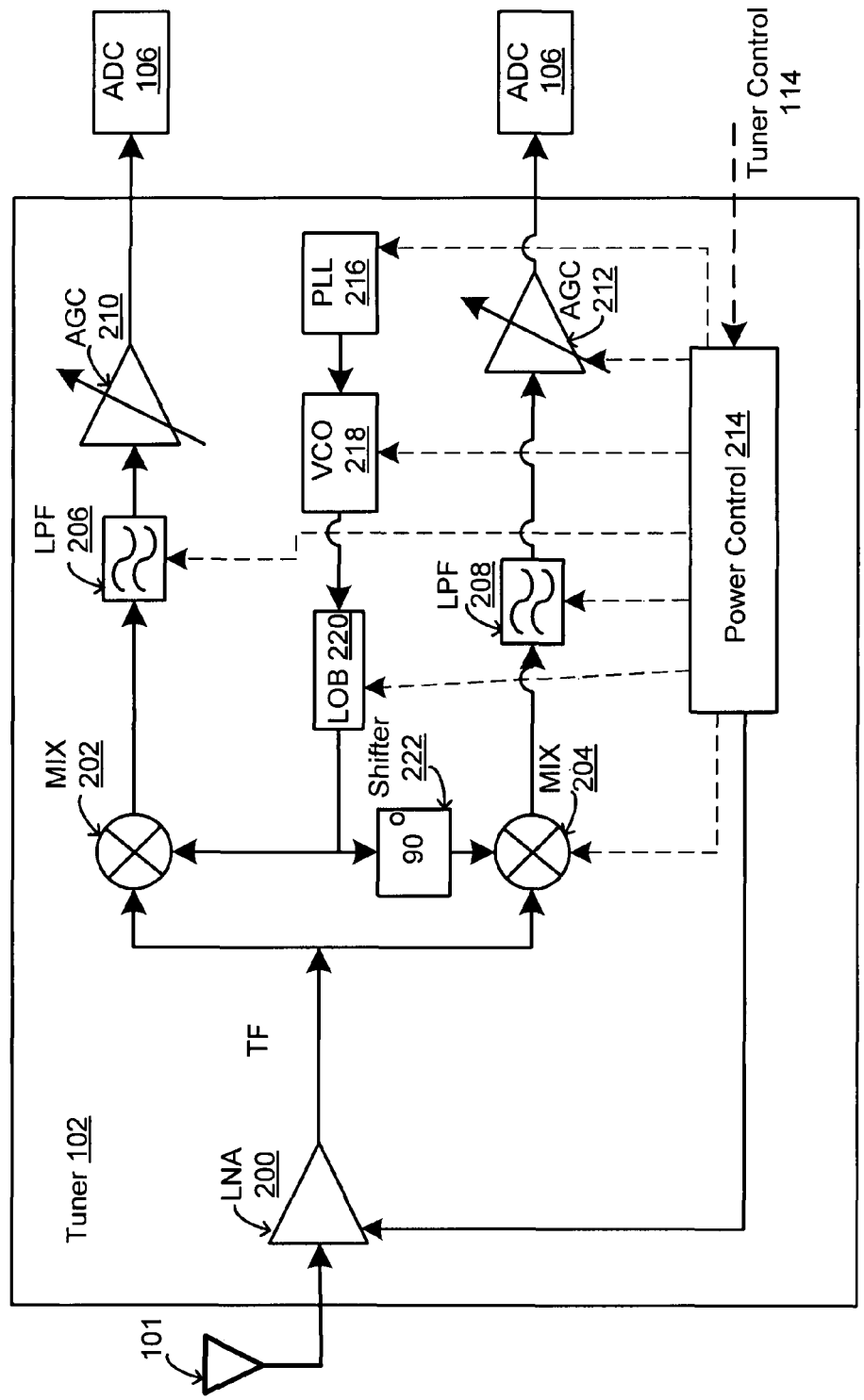
FIG. 2 is a block diagram of an exemplary tuner with direct conversion architecture.

FIG. 2 is a block diagram of an exemplary tuner 102 with direct conversion architecture. In exemplary embodiments, an RF signal is received by the antenna 101 which provides the RF signal to the tuner 102. At the tuner 102, the RF signal is amplified by a low noise amplifier (LNA) 200. The RF signal is then split into two branches including an inphase branch and quadrature phase branch. The RF signal in the inphase branch is mixed with a sinusoidal signal in mixer 202. The RF signal on the quadrature branch is mixed with a sinusoidal signal shifted by 90 degrees in a mixer 204. The RF signals are mixed with the sinusoidal signals so as to produce a replica of the signal(s) centered on a low intermediate frequency (IF) or centered on zero frequency (DC).

The down converted mixed signal from the inphase branch is passed through a low pass filter (LPF) 206 which rejects signals which are outside the band of the signal of interest. An automatic gain control (AGC) 210 may then adjust the filtered signal power to a desired level. The AGC 210 outputs the signal to the ADC 106 for sampling. Similarly, the down converted mixed signal from the quadrature phase branch is passed through a LPF 208 which rejects signals that are outside the band of the signal of interest. An AGC 212 may then adjust the filtered signal power to a desired level. The AGC 212 outputs the signal to the ADC 106 for sampling.

The tuner 102 of FIG. 2 also implements power control circuitry 214 that can reduce the power consumption of some or all of the components in the tuner 102, by controlling the currents going into the tuner's components. The currents going into the components can be turned off completely, setting them to "power off" mode, or can be reduced, setting them into "power standby" mode. The power control circuitry 214 may be controlled by the DSPHW 104 using the tuner control line 114. In one embodiment, the current to the tuner 102 can be significantly reduced by setting components to "power off" or "standby" modes, while still maintaining the phase of the local oscillator carrier generated by a tuner PLL 216. Those skilled in the art will appreciate that there are many methods for implementing power control circuitry in the components of the tuner 102.

Optionally, the sinusoidal signal received by the mixers 202 and 204 may be initially generated by the PLL 216. In one example, the PLL 216 generates a signal and provides the signal to a voltage controlled oscillator (VCO) 218 which then provides the signal to a local oscillator buffer (LOB) 220. The resulting sinusoidal signal is then split. The mixer 202 subsequently receives the sinusoidal signal. A shifter 222 shifts the split sinusoidal signal by ninety degrees, and then provides the shifted sinusoidal signal to the mixer 204. Those skilled in the art will appreciate that there are many ways to generate a sinusoidal signal. The PLL 216, the VCO 218, the LOB 220, the mixer 204, and/or the mixer 202 can all be placed in "standby", "off", or "on" power modes by the power control circuitry 214.

Figure 3:
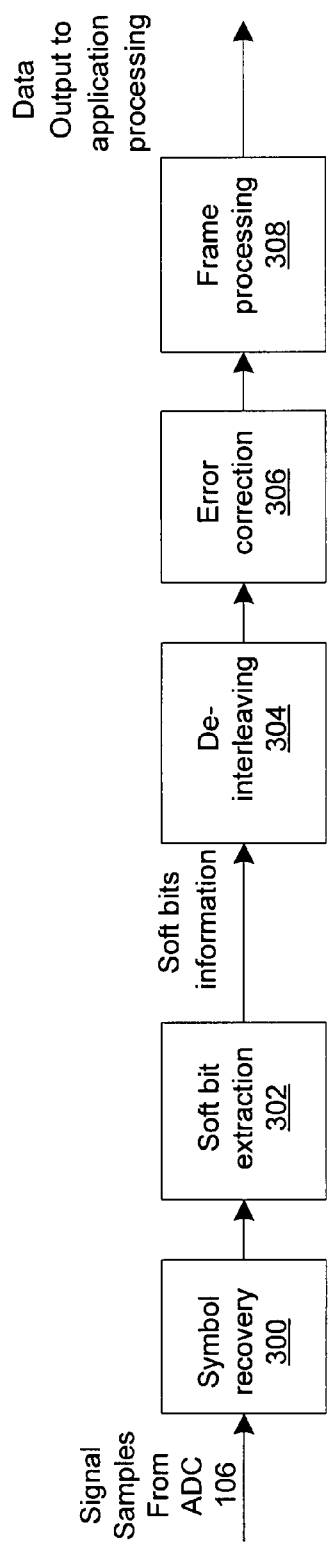
FIG. 3 is an exemplary processing system for processing a received digital transmission to retrieve transmitted data bits.

FIG. 3 is an exemplary processing system for processing a received digital transmission to retrieve transmitted data bits. In one example, the DSPHW 104 processes the sequence of functions to retrieve transmitted data bits from the received sequence of symbols. The sampled signal streams from the ADC 106 into a symbol recovery function 300. The symbol recovery function 300 can recover the transmitted symbol by performing functions such as carrier synchronization, symbol timing synchronization, FFT, and equalization. From the recovered symbol, the DSPHW 104 can extract soft bit information.

In one exemplary system, the recovered symbol is an OFDM symbol where each symbol is comprised of a plurality of sub-carriers where each sub-carrier carries a quadrature amplitude modulated (QAM) sub-symbol. In various embodiments, the sub-symbol is a basic data carrying unit in an OFDM symbol. The sub-symbol can be comprised of a QAM signal carried over one of the OFDM symbol carrier, during the duration of a single OFDM symbol. Each sub-symbol contains information of one or more data bits, represented by the phase and amplitude of the sub-carrier.

A soft bit extraction function 302 associates likelihood information to estimate probability of a received data bit being a "1" or a "0". In one exemplary implementation, a positive valued soft bit indicates a "0" data bit. The greater the value magnitude of the positive soft bit, the greater is the likelihood that the received data bit is "0". A negative valued soft bit may indicate a "1" data bit. The greater the value magnitude of the negative soft bit, the greater is the likelihood that the received information bit is "1". In other exemplary system a positive value represent a "1" while negative value represents a "0".

The soft bit information is then sent to a de-interleaving function 304. The de-interleaving function 304 reverses the interleaving function performed at the transmitter by rearranging the soft bits according to a predefined order-permutation formula. A sequential stream of soft bits before the de-interleaving function 304 can become non-sequential after the de-interleaving function 304.

The de-interleaved soft bit stream may then be decoded by an error correction function 306. The error correction function 306 can use the soft bit information in order to recover the transmitted data bits. In one example, a Viterbi decoder is used for error correction.

The decoded data bits can then be sent to a frame processing function 308. One example of the frame processing function 308 comprises: extracting multiple logical channel streams from the bit stream; parsing data headers and data packets from the logical streams; performing Reed Solomon error correction; performing cyclic redundancy check (CRC) on data packets to check if a packet contains bit errors; and holding statistical counters that count the number of packets with errors and number of counters without error, thus providing a packet error rate (PER) measurement.

The resulting data packets may be further be processed at an application level (not depicted). Such processing generally depends on the usage of the system. In one example, the data packets are decompressed to produce an audio stream.

Those skilled in the art will appreciate that the functions/processes described in the symbol recovery function 300, soft bit extraction function 302, de-interleaving function 304, error correction function 306, and frame processing function 308 may be performed by hardware, software, or a combination of hardware and software.

Figure 4:
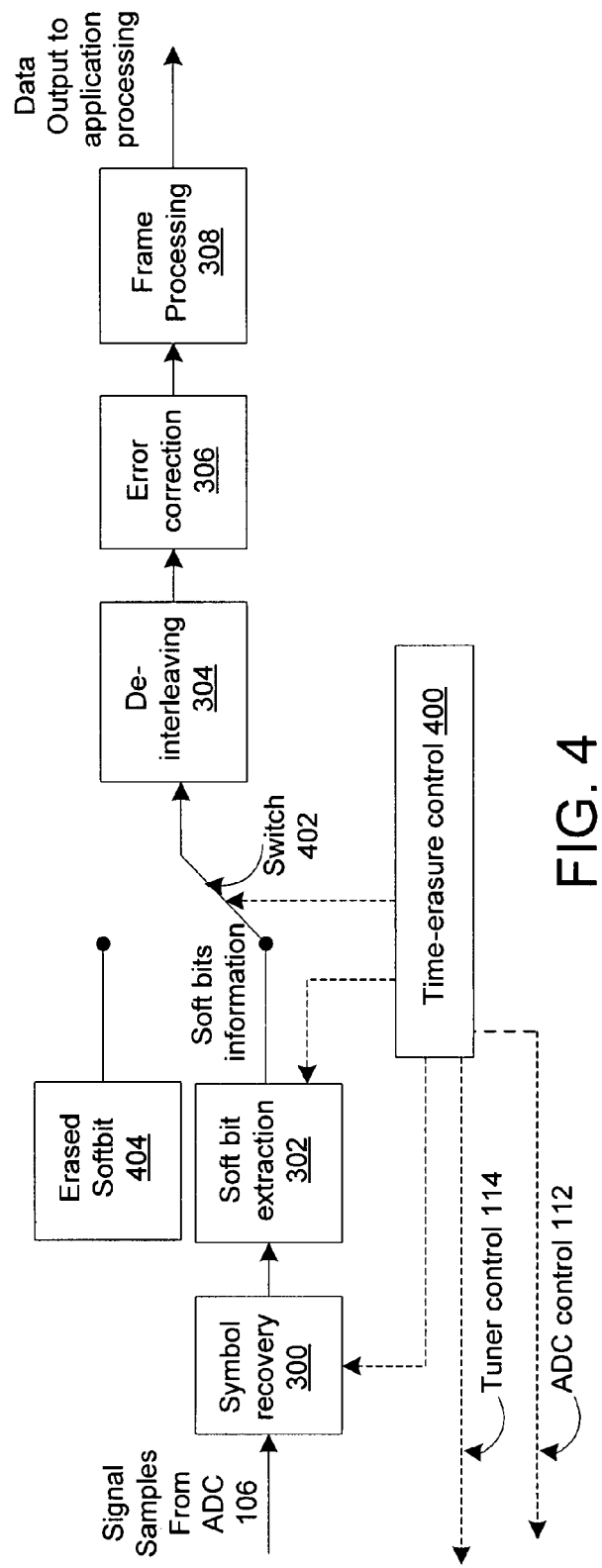
FIG. 4 is an exemplary system for a modified processing sequence of a received digital transmission incorporating time erasure.

FIG. 4 is an exemplary system for a modified processing sequence of a received digital transmission incorporating time erasure. In various embodiments, the processing sequence of functions is implemented by a DSPHW 104 that can insert soft bit erasures and retrieve transmitted data bits from a received sequence of symbols.

In one example, the DSPHW 104 incorporates a time-erasure control function 400 (TECF). The TECF 400 inserts erasure intervals (EI) periodically during the reception of the transmitted frames in order to reduce the power consumption of the receiver device 100. During the non-erasure interval, a switch 402 is set by the TECF 400 to stream the received soft bits from the soft bit extraction function 302. During erasure intervals, the TECF 400 will change the switch 402 to provide erased soft bits from the erased softbit function 404. In some examples, the switch 402 describe here may be implemented in the DSPHW 104 using digital circuitry or by software logic.

The TECF 400 can continuously update the duration of the erasure interval thereby controlling the number of erased bits in a frame. At the de-interleaving function 304, a consecutive set of erased soft bits will be spread and mixed with received soft bits, therefore preventing long sequences of erased bits. The sequence of erased and non-erased soft bits is then sent to the error correction function 306. The error correction function 306 is capable of using the non-erased soft bits, while ignoring the erased soft bits, in order to retrieve the transmitted information data with a BER lower then the MAB threshold. The erased soft bits may be generated internally within the DSPHW 104.

The components of the receiver device 100 that are used to receive the transmitted signal can be set to an "off" mode or "standby" mode during the erasure interval. In one example, the TECF 400 can send a corresponding control signal to the components of the tuner 102, ADC(s) 106, and digital circuitry that process the sampled signal, to set them to "off" or "standby" mode. At the end of the erasure signal, the TECF 400 can send the appropriate signal to activate (i.e., turn "on") the components of the receiver device 100.

In another exemplary implementation, the DSPHW 104 comprises a programmable signal processor (PSP). In one example, some of the functions described in FIG. 4 are calculated by the PSP. During the erasure interval, the symbol processing functions are not evoked but rather the PSP can idle instead of performing calculations. The PSP can incorporate power circuitry that clock gate most of the circuitry of the PSP and/or receiver device 100 during idle time, thereby reducing the power consumption of the PSP, and further reducing the overall power consumption of the receiver device 100.

Various embodiments can take advantage of the reception coding margin RCM in order to save the average power consumption of the receiver device 100. Further, the receiver device 100 may take advantage of the RCM in order to tune and demodulate a secondary communication channel.

In one example, a radio frequency receiver may be designed to demodulate an NRSC-5 signal using the system and methods herein described to reduce the power consumption of the receiver. In another example, a radio frequency receiver designed to demodulate the DAB/TDMB signal may use the system and methods herein described to reduce the power consumption of the receiver.

Figure 5:
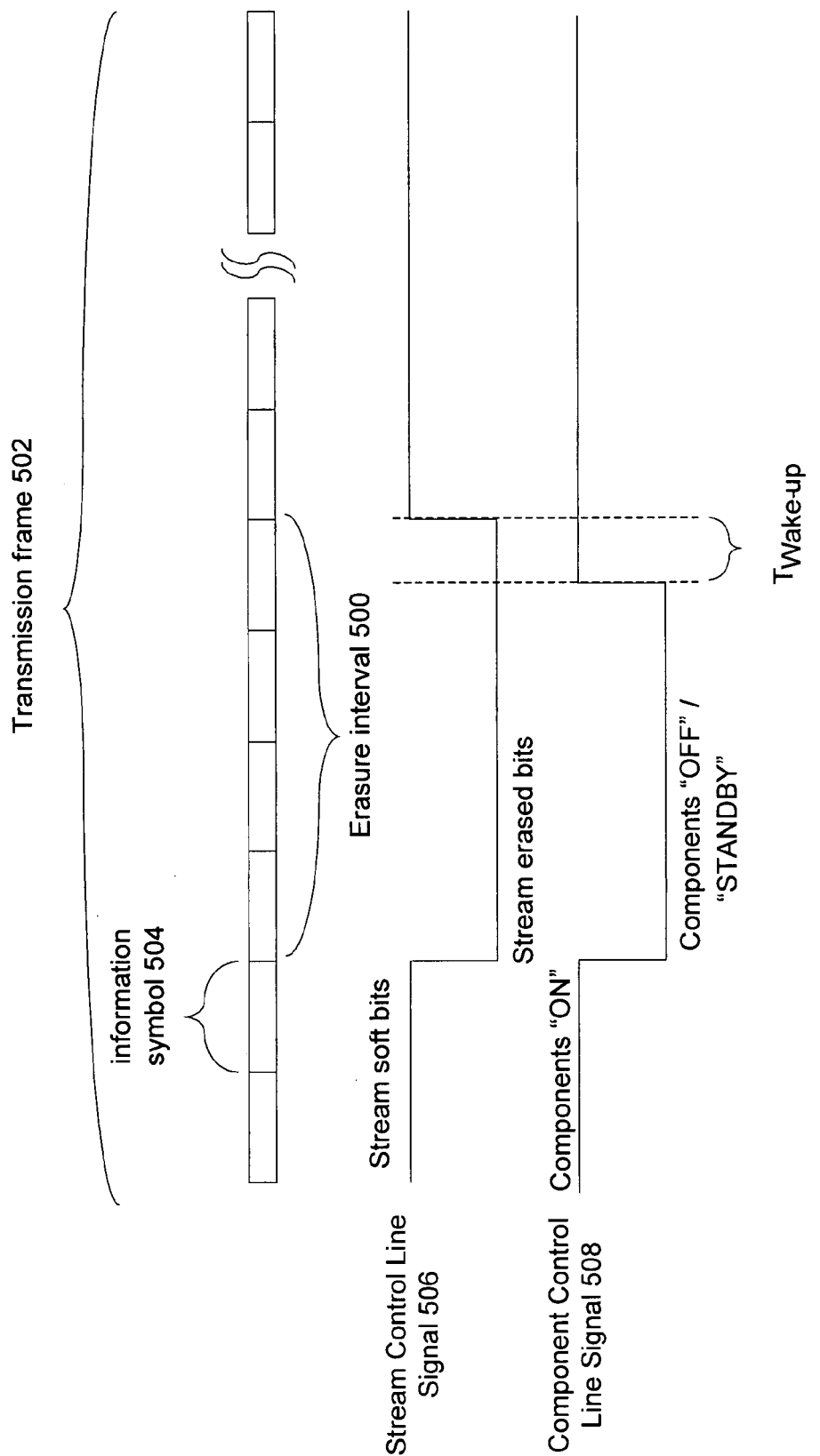
FIG. 5 is an exemplary timeline showing erasure interval and control signals in relationship to a received transmission frame.

FIG. 5 is an exemplary timeline showing an erasure interval (EI) 500 and control signals relative to a received transmission frame 502. FIG. 5 shows the erasure interval 500 extending over several symbols 504 in a frame. The erasure interval 500 may comprise of consecutive sets of erased symbols 504 as shown or of a non-consecutive set of erased symbols 504. A corresponding stream control line signal 506 may stream soft bits in the non-erasure interval or erased soft bits in the erasure interval 500. In some embodiments, the stream control line signal 506 can be generated by the TECF 400 to control the switch 402.

Another corresponding component control line signal 508 may set components in "off" or "standby" modes at the start of the erasure interval 500. The components are turned "on" $T_{wake\_up}$ time (i.e., wakeup interval) before the end of the erasure interval 500. The $T_{wake\_up}$ time can be set to account for the time it takes for the components of the receiver device 100 to transition from "off" or "standby" mode to the "on" mode. In exemplary embodiments, the $T_{wake\_up}$ time can be used to ensure that a signal in the non-erasure time will not be corrupted because of the transition. In one example, the DSPHW 104 transmits a wakeup signal to one or more receiver device components to activate the respective component(s). In some embodiments, the component control line signal 508 can be generated by the TECF 400 to control the tuner 102 (e.g., over the tuner control line 114) and/or the ADC(s) 106 (e.g., over the ADC control line 112).

In one exemplary implementation, a Viterbi decoder performs the error protection decoding. In such an implementation, a positive valued soft bit may indicate a "0" data bit. The greater the magnitude of the positive soft bit, the greater is the likelihood that the received data bit is "0". A negative valued soft bit may indicate a "1" data bit. The greater the magnitude of the negative soft bit, the greater is the likelihood that the received information bit is "1". A soft bit with a value of zero (non-negative and non-positive), indicates an equal likelihood that the received data bit is "0" or "1". In such a system, an erased soft bit is represented by the value zero. The DSPHW 104 may, therefore, write a value of zero for each soft bit that corresponds to the erasure interval. At the Viterbi decoder, the zero valued soft bits may not contribute the Viterbi branch metrics.

Figure 6:
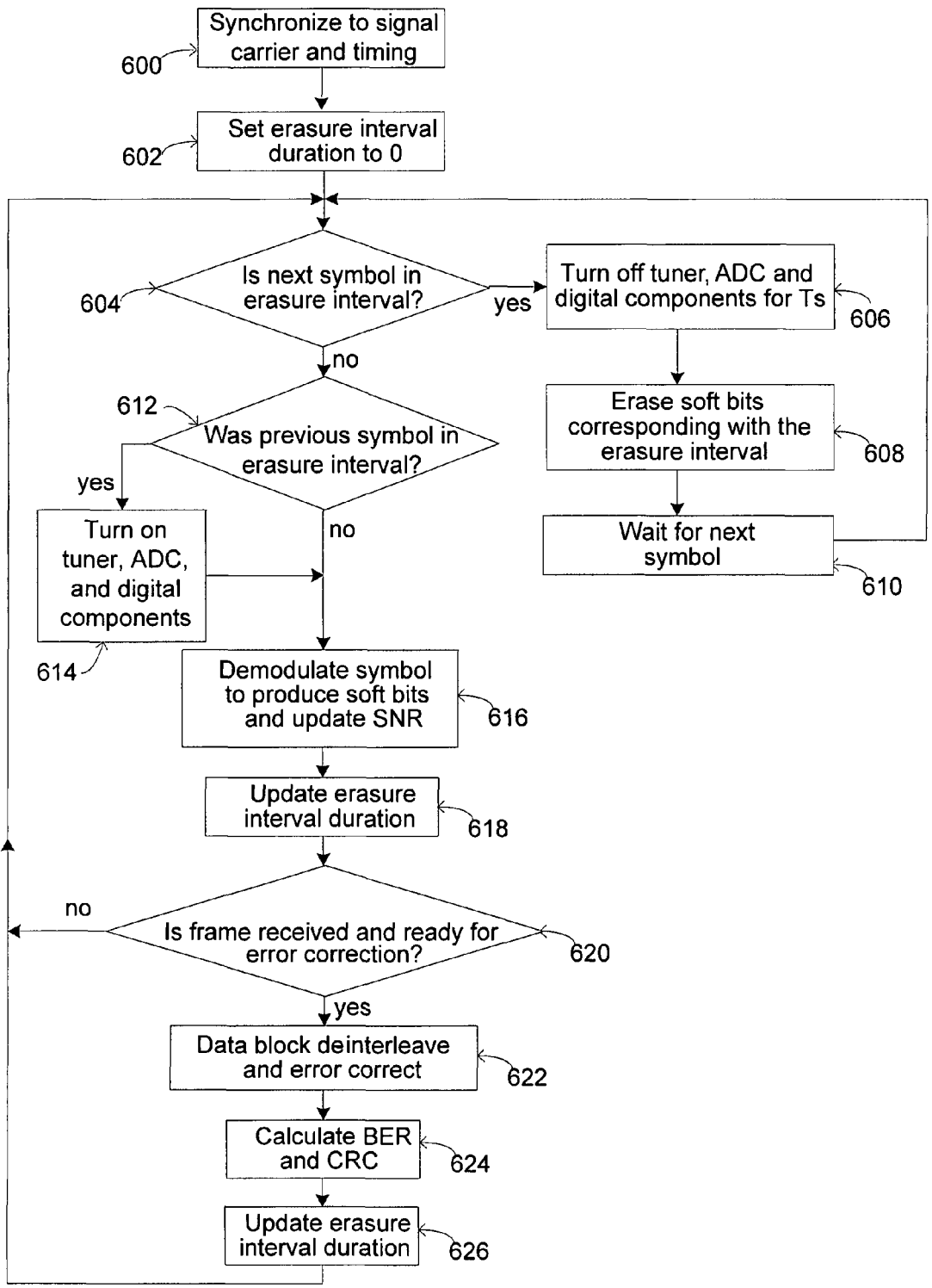
FIG. 6 is a flow chart describing an exemplary method for determining time erasure and controlling power management.

FIG. 6 is a flow chart describing an exemplary method for determining time erasure and controlling power management. In step 600, the receiver device 100 tunes to the desired channel frequency and performs synchronization to the carrier and timing of the desired channel. In step 602, the DSPHW 104 initializes the erasure interval to zero.

In step 604, the DSPHW 104 checks if a next symbol belongs to an erasure interval. If the symbol belongs to the erasure interval, then in step 606, the DSPHW 104 will turn off the components of the tuner 102 and the ADC(s) 106, thereby reducing the power consumption of the tuner 102 and ADC(s) 106 during the erasure interval.

In step 608, the DSPHW 104 will then erase the soft bits information corresponding with the erasure interval. The erased soft bits may be written to the deinterleaving function 304. Subsequently, the DSPHW 104 waits for a period of a symbol (Ts) minus a predetermined $T_{wake\_up}$ period in step 610. During the wait time, the DSPHW 104 can be placed in a "stand by" mode, where most of the digital logic can be clock gated off thereby reducing the power consumption of the DSPHW 104 during the erasure interval. The $T_{wake\_up}$ period may be set such that the DSPHW 104 has enough time to get out of "standby" mode and turn "on" the different component of the system, before receiving the next symbol. The receiver device 100 can then return to step 604, to determine if the next symbol belongs to an erasure interval or not.

If the next symbol is not a part of the erasure interval in step 604, the DSPHW 104 will check, in step 612, if the previous symbol belonged to an erasure interval. If the previous symbol belonged to an erasure interval, then, in step 614, the DSPHW 104 will turn "on" the tuner 102, the ADC(s) 106, and/or any other digital components in order to demodulate the next symbol. If the previous symbol did not belonged to an erasure interval, the components of the receiver device 100 may already be activated.

In step 616, the DSPWH 104 demodulates the received data, to produce a vector of soft bits. The DSPHW 104 also produces an estimated average signal-to-noise (SNR) measurement. Those skilled in the art will appreciate that there are many methods to estimate the average SNR measurement. The SNR estimation can typically be done over one or more symbols. Alternately, the SNR estimation can be a moving average estimation based on the recently received symbol and the past received symbols. In some embodiments, the determination of the SNR estimation can be changed to accommodate different type of reception conditions.

In step 618, the DSPWH 104 uses the averaged SNR estimation to re-estimate the current reception coding margin and update the erasure interval duration accordingly. The duration of the erasure interval can increase or decrease. In one example, the duration of the erasure interval is increased such that more symbols in a frame are erased. When the SNR degrades below a certain threshold, the DSPHW 104 can eliminate the erasure interval completely. Exemplary methods for updating the erasure interval are further described herein.

In step 620, the DSPWH 104 checks if enough symbols are received to process a full block of code or a full data frame. A full block of code may be the number of soft bits that comprise a codeword that can be decoded by the error correction function 306 to produce an error corrected bit stream. A full frame may be one or more codewords that comprise a useful block of information used by the application. In some examples, such a block of information may be a set of compressed audio packets that may be further protected from errors by means of cyclic redundancy codes (CRC). If the DSPHW 104 does not receive enough symbols, the DSPHW 104 returns to step 604 until sufficient symbols have been received.

In step 622, the DSPHW 104 will complete the soft bit de-interleaving. The DSPHW 104 will then perform error correction decoding on the block of data. In various examples, such error correction may comprise Viterbi decoding, Reed Solomon decoding, a combination of both Viterbi and Reed Solomon decoding, or any other form of error correction decoding. In systems that encapsulate the data stream into packets and provide cyclic redundancy error (CRC) protection, the DSPHW 104 can calculate the CRC and check if packets contain errors.

In step 624, the DSPWH 104 calculates a codeword based error rate or a frame based error rate. In one exemplary embodiment, the DSPHW 104 calculates the hard coded bit error rate (BER) of the Viterbi decoder. In another embodiment, the DSPHW 104 calculates the packet error rate (PER) by counting the number of errors in Reed Solomon codewords in the frame. The DSPHW 104 can also calculate the PER of packets in the frame by counting the number of packets with CRC errors.

In step 626, the DSPHW 104 uses the calculated BER, PER, or any other method for measuring the error rate of the receive data, in order to re-estimate the current RCM and update the erasure interval duration. The duration of the erasure interval can increase, such that more symbols in the next frame are erased or can be decreased. In some cases, when the BER or PER degrades below a certain threshold, the DSPHW 104 may eliminate the erasure interval completely. The BER and PER statistics may depend on collecting a full frame that spans over multiple symbols. As a result, it may be a slower and more accurate mechanism to update the erasure interval then the mechanism of step 618. After the erasure interval is updated, the DSPHW 104 returns to step 604, to process the next symbol.

In another exemplary implementation, where the time erasures are performed on an NRSC-5 FM hybrid system, the DSPHW 104 can implement the following method for updating the erasure interval in step 618:

1. The DSPHW 104 first calculates a minimum SNR at the $n^{th}$ OFDM symbol n according to the following formula:

SNR_average_HI[$n$]=(1−ALPHA)*SNR_average_HI[$n$−1]+ALPHA*SNR_HI[$n$]

SNR_average_LO[$n$]=(1−ALPHA)*SNR_average_LO[$n$−1]+ALPHA*SNR_LO[$n$]

SNRmin_tmp[$n$]=minimum(SNR_average_LO, SNR_average_HI);

SNRmin_tmp[$n$]=minimum(SNR_average_LO[$n$], SNR_average_HI[$n$]);

where:
  ALPHA is a constant determining the average duration.
  SNR_HI is the average SNR on the upper digital sideband calculated as follows:
  SNR_HI=sum$_k${(Pav[k]−P[k])*conj(Pav[k]−P[k])}, k belong to the set of upper sideband reference sub carriers indices.
SNR_LO is the average SNR on the lower digital sideband calculated as follows:
  SNR_LO=sum$_j${(Pav[j]−P[j])*conj(Pav[j]−P[j])}, j belong to the set of lower sideband reference sub carriers indices.

Pav[k] is an average reference symbol calculated as follows:
Pav[k,n]=sum$_i${(Pav[k,n−i]/N}i=0, 1 . . . N−1. and n is the index of the current OFDM symbol and k belong to the set of reference sub carriers indices.

P[k] is the current reference sub carrier k, where k belongs to the set of reference sub carriers indices.

2. The DSPHW 104 holds SNRmin which is the minimum SNRmin_tmp[n] over the last M OFDM symbols in the non-erased interval that precede the erasure interval. Here M is a parameter OFDM that can be set empirically.

3. The DSPHW uses SNRmin to determine the erasure interval. An exemplary method to determine the erasure interval by using a look-up table is as follows:

| SNRmin value | Erasure interval duration |
|---|---|
| SNRmin < TH1 | Tei3 |
| TH1 ≦ SNRmin < TH2 | Tei2 |
| TH2 ≦ SNRmin < TH3 | Tei1 |
| TH3 ≦ SNRmin | 0 |

Where the thresholds TH1, TH2, and TH3 and Tei1, Tei2, and Tei3 can be determined empirically such that when SNRmin is in a certain value range the erasure interval is set so that the BER is lower or equal to the MAB threshold.

In another exemplary implementation, where the time erasures are performed on an NRSC-5 FM hybrid system, the DSPHW 104 can implement the following method for updating the erasure interval in step 626. The DSPHW 104 performs Viterbi decoding over a whole or partial P1 transmission frame using the interleaved erased and non-erased soft bits. The decoded data bits are re-encoded using the same convolutional encoder as defined at the transmitter. The decoded data bits are XOR with the hard decisions of the soft bits. Hard decision can be done with the following function: If soft_bit≧0 then hard_decision=0; else hard decision=1. The XOR operation bit sequence output is accumulated, to provide an estimate of un-coded number of error in a transmission frame. The number of errors are used to determine the erasure interval duration in the following frame.

Other methods can be implemented to update the erasure interval based on SNR, BER, PER, or any other statistical estimation of the RCM by one familiar in the art.

It should be understood by one skilled in the art that the systems and methods described herein can be used in any other tuner architecture such as a dual conversion or a super heterodyne.

The above-described functions and components, including but not limited to functions, can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

Embodiments of the present invention have been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A system for power conservation in a receiver device, comprising:
    a tuner configured to receive a transmitted signal of modulated information intended for the receiver device, wherein the modulated information includes symbols;
    an analog-to-digital converter (ADC) that samples the received transmitted signal provided by the tuner; and
    digital signal processing hardware (DSPHW) that:
        extracts soft bit information from the sampled signal provided by at least one analog-to-digital converter,
        determines if a symbol included in the sampled signal belongs to an erasure interval, wherein the erasure interval covers a set of symbols for which the soft bit information is replaced with information that is not provided by an analog-to-digital converter,
        generates a control signal to configure a receiver device component to conserve power based on the determination, and
        recovers the modulated information based on the extracted soft bit information in spite of an occurrence of an erasure interval.

2. The system of claim 1 wherein the DSPHW further performs clock gating to conserve power in the receiver device.

3. The system of claim 1 wherein the tuner component transitions between different power modes responsive to the control signal.

4. The system of claim 1 wherein the DSPHW further generates a wakeup signal to activate a receiver device component.

5. The system of claim 1, wherein the DSPHW further updates a duration of the erasure interval based on an estimated signal-to-noise ratio of the sampled signal and a reception coding margin of the sampled signal, wherein the reception coding margin is based on a difference between a maximum allowed bit error rate threshold and a decoded bit error rate.

6. The system of claim 1, wherein the DSPHW further streams erased bits based on the determination.

7. A method for power conservation in a receiver device, comprising:
    receiving a transmitted signal of modulated information intended for the receiver device, wherein the modulated information includes symbols;
    extracting soft bit information from the transmitted signal;
    determining if a symbol within the transmitted signal belongs to an erasure interval, wherein the erasure interval covers a set of symbols for which the soft bit information is replaced with other information;
    generating a control signal to configure a receiver device component to conserve power based on the determination; and
    recovering the modulated information based on the extracted soft bit information in spite of an occurrence of an erasure interval.

8. The method of claim 7 wherein generating the control signal further conserves the power of a tuner component.

9. The method of claim 7 wherein the generated control signal further conserves the power of a DSPHW component.

10. The method of claim 7 wherein the generated control signal further conserves the power of the ADC.

11. The method of claim 7 further comprising clock gating, wherein the clock gating conserves power of the receiver device.

12. The method of claim 7 wherein the generated control signal transitions a tuner component between different power modes.

13. The method of claim 7 further comprising generating a wakeup signal that activates a receiver device component.

14. The method of claim 7, further comprising updating a duration of the erasure interval based on an estimated signal-to-noise ratio of the transmitted signal and a reception coding margin of the transmitted signal, wherein the reception coding margin is based on a difference between a maximum allowed bit error rate threshold and a decoded bit error rate.

15. The method of claim 7 further comprising streaming erased bits based on the determination.

16. A system for power conservation in a receiver device, comprising:

means for receiving a transmitted signal of modulated information intended for the receiver device, wherein the modulated information includes symbols;

means for extracting soft bit information from the transmitted signal;

means for determining if a symbol within the transmitted signal belongs to an erasure interval, wherein the erasure interval covers a set of symbols for which the soft bit information is replaced with other information;

means for generating a control signal to configure a receiver device component to conserve power based on the determination;

means for recovering the modulated information based on the extracted soft bit information in spite of an occurrence of an erasure interval.

17. The system of claim 16 further comprising a means for streaming erased bits based on the determination.

\* \* \* \* \*